(12) United States Patent
Godin et al.

(10) Patent No.: US 11,343,731 B2
(45) Date of Patent: May 24, 2022

(54) METHODS AND APPARATAE FOR MOBILITY IN PRIVATE NETWORKS

(71) Applicant: Nokia Solutions and Networks Oy, Espoo (FI)

(72) Inventors: Philippe Godin, Versailles (FR); György Wolfner, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/990,266

(22) Filed: Aug. 11, 2020

(65) Prior Publication Data
US 2021/0051543 A1 Feb. 18, 2021

Related U.S. Application Data

(60) Provisional application No. 62/887,380, filed on Aug. 15, 2019.

(51) Int. Cl.
| | |
|---|---|
| *H04W 4/00* | (2018.01) |
| *H04W 36/00* | (2009.01) |
| *H04W 76/11* | (2018.01) |
| *H04W 8/08* | (2009.01) |
| *H04W 36/08* | (2009.01) |

(Continued)

(52) U.S. Cl.
CPC ......... *H04W 36/0079* (2018.08); *H04W 8/08* (2013.01); *H04W 36/08* (2013.01); *H04W 36/32* (2013.01); *H04W 48/16* (2013.01); *H04W 76/11* (2018.02)

(58) Field of Classification Search
CPC ..... H04W 36/30; H04W 36/18; H04W 36/08; H04W 36/14; H04W 36/12; H04W 36/0079; H04W 36/32; H04W 28/04; H04W 72/04; H04W 72/042;

(Continued)

(56) References Cited

U.S. PATENT DOCUMENTS

| | | | | |
|---|---|---|---|---|
| 2015/0181474 | A1* | 6/2015 | Horn | H04W 12/08 370/331 |
| 2015/0296365 | A1* | 10/2015 | Choi | H04W 48/16 370/336 |
| 2016/0183156 | A1* | 6/2016 | Chin | H04L 61/2007 370/331 |

FOREIGN PATENT DOCUMENTS

EP 2424296 A1 2/2012

OTHER PUBLICATIONS

"New Work Item Proposal on Private Network Support for NG-RAN", 3GPP TSG RAN Meeting #83, RP-190729, Agenda : 9.1.3, China Telecom, Mar. 18-21, 2019, 5 pages.

(Continued)

*Primary Examiner* — Temica M Beamer
(74) *Attorney, Agent, or Firm* — Nokia Solutions and Networks Oy

(57) ABSTRACT

In accordance with an example embodiment of the present invention a source node decides to attempt to handover a user equipment to a target cell based at least in part on a comparison of a closed access group information of the user equipment and a stored closed access group information of a target cell associated with the target node. The source sends to the target node a handover message comprising an identifier of the target cell, receives from the target node a handover failure message comprising second closed access group information of the target cell which the source node uses to update the stored closed access group information of the target cell.

20 Claims, 3 Drawing Sheets

(51) Int. Cl.
  *H04W 36/32* (2009.01)
  *H04W 48/16* (2009.01)
(58) Field of Classification Search
  CPC ....... H04W 76/11; H04W 48/16; H04W 8/08;
       H04W 88/08; H04L 5/0007
  USPC .......................................... 370/329; 455/436
  See application file for complete search history.

(56) References Cited

OTHER PUBLICATIONS

"3rd Generation Partnership Project; Technical Specification Group Services and System Aspects; System Architecture for the 5G System; Stage 2 (Release 16)", 3GPP TS 23.501, V16.1.0, Jun. 2019, pp. 1-368.

"3rd Generation Partnership Project; Technical Specification Group Services and System Aspects;Procedures for the 5G System; Stage 2 (Release 16)", 3GPP TS 23.502, V16.1.1, Jun. 2019, pp. 1-495.

Extended European Search Report received for corresponding European Patent Application No. 20190806.8, dated Jan. 13, 2021, 14 pages.

"Multiple CAG IDs in a CAG cell", 3GPP TSG-SA WG2 Meeting #132, S2-1903350, InterDigital Inc, Apr. 8-12, 2019, pp. 1-3.

"Introduction of Public Network Integrated NPN", 3GPP TSG-RAN WG3#105, R3-193962, Nokia, Aug. 26-30, 2019, 13 pages.

* cited by examiner

METHODS AND APPARATAE FOR MOBILITY IN PRIVATE NETWORKS

RELATED APPLICATION

The present application claims priority from U.S. provisional Application No. 62/887,380 filed 15 Aug. 2019, which is hereby incorporated in its entirety.

TECHNICAL FIELD

The present application relates generally to provisioning of mobility in private networks.

BACKGROUND

In mobile networks, mobility may be used in general to handover a user equipment from one (source) network cell to another (target) network cell. Where mobile networks comprise private (non-public) networks, certain cells may however restrict access to user equipments with adequate access rights. A manner of managing such access rights is through closed access groups, such as defined in 3GPP TS23.501, wherein each private cell may restrict access to one or more closed access groups, each defined by an identifier unique within a public land mobile network, and a user equipment may be configured to allow access to public cells and/or zero or more closed access groups.

In order to facilitate mobility to private cells, a source node should not handover a user equipment to a target node if the target cell is a private cell, the closed access groups of which the user equipment is not allowed to access. A source node should also not handover a user equipment to a public (i.e. non-private) cell if the user equipment is allowed to access only private cells.

SUMMARY

Various aspects of examples of the invention are set out in the claims.

According to a first aspect of the present invention, there is disclosed a method, apparatus, computer program, computer programmable medium and means for deciding to attempt to handover a user equipment to a target cell, wherein, when stored closed access group information of the target cell is available, the deciding based at least in part on a comparison of a closed access group information of the user equipment and a stored closed access group information of a target cell associated with the target node; for sending, to the target node, a handover message comprising an identifier of the target cell; for receiving, from the target node, a handover failure message comprising second closed access group information of the target cell; and for updating, when stored closed access group information of the target cell is available, the stored closed access group information of the target cell with the second closed access group information of the target cell and storing, when stored closed access group information of the target cell is not available, the second closed access group information of the target cell.

According to a second aspect of the present invention, there is disclosed a method, apparatus, computer program, computer programmable medium and means for receiving a handover request message comprising a closed access group information of a user equipment and an identifier of a target cell; for deciding, at least in part based on one of: a comparison of the closed access group information of the user equipment and stored closed access group information of the target cell or a determination that the target cell does not support any closed access groups and that the closed access group information of the user equipment indicates the user equipment not to be allowed to be handed over to cells not supporting closed access groups, that the user equipment is not allowed to be handed over to the target cell; and sending, towards a source node associated with the handover request message, a handover failure message including the stored closed access group information of the target cell.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
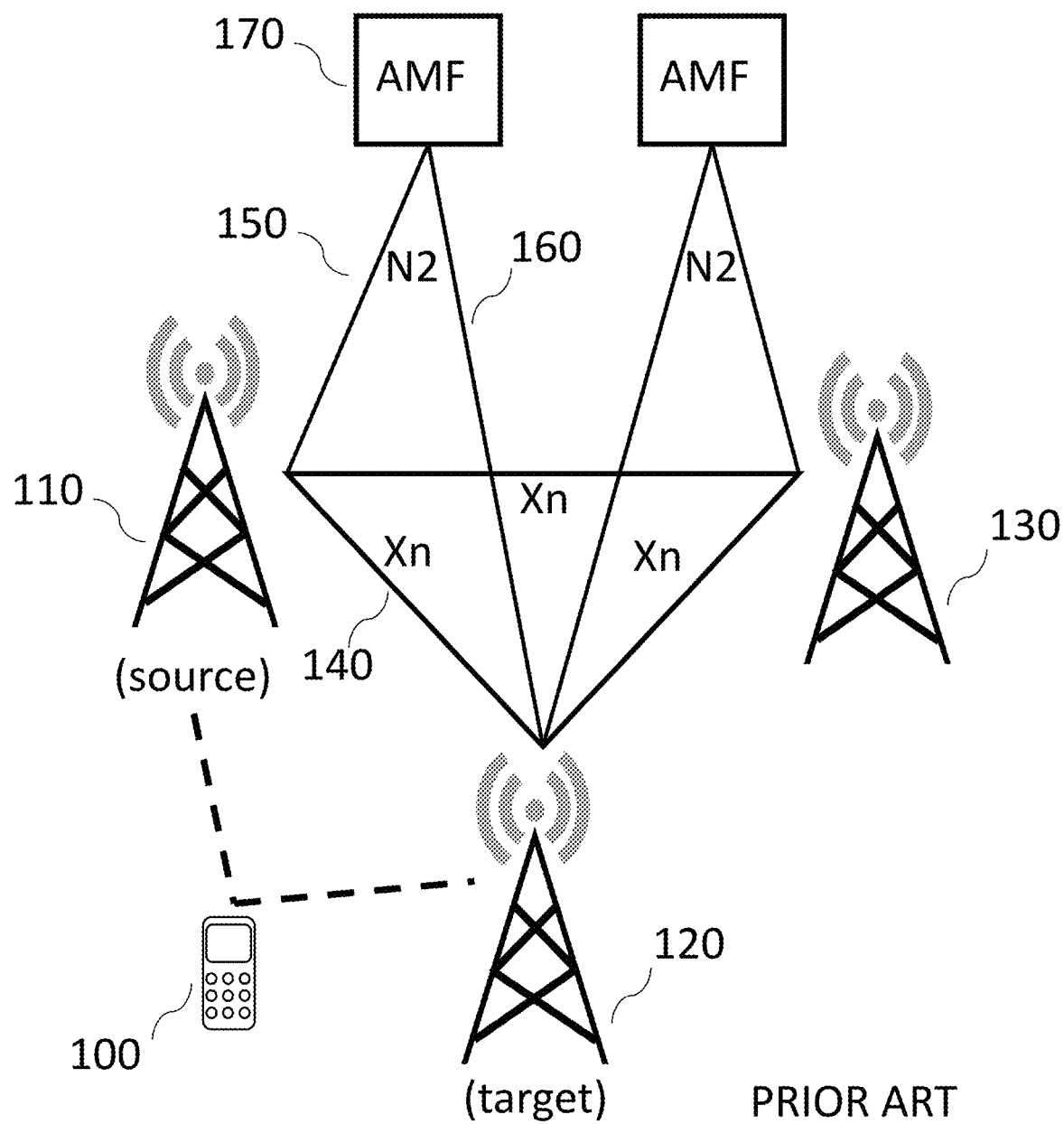
FIG. 1 illustrates a portion of a mobile network.

FIG. 1 depicts an example of a network in which a user equipment (100) is to be handed over from a source node (110) to a target node (120), wherein source node (110) and target node (120) may or may not be connected through a connection (140), typically termed an Xn connection, and where the source node and target node are each connected to an access and mobility management function (AMF, 170) through respective connections (150, 1600), typically termed N2 connections. Each node (110, 120, 130) may manage one or more cells. The access and mobility management function (170) is typically considered part of a core network otherwise not depicted, whereas access nodes (110, 120, 130) are considered part of the radio access network.

When the source node and target are connected through an Xn connection, it is assumed that the source node and target node have exchanged closed access group information at setup of the Xn connection. The closed access group information may indicate whether a cell is a public and/or private cell and if it is a private cell, which closed access groups are allowed access. In addition, it is assumed that the source node has obtained closed access group information for a user equipment prior to handover of the user equipment, which may indicate whether the user equipment is allowed to access public and/or private cell and if the user equipment is allowed to access private cells, which closed access groups it is allowed to access. Comparing the closed access group information of the target cell and the closed access group information of the user equipment allows the source cell to determine whether the user equipment may be handed over to the target cell, which is generally allowed when the user equipment is allowed to access public cells and the target cell is a public cell or when the user equipment is allowed to access at least one of the closed access groups that the target cells permits access to.

When no Xn connection has been setup between the source node and the target node, the source node and target node cannot be assumed to have exchanged closed access group information. In such cases, the source node may, prior to handover of the user equipment to the target cell, request the user equipment to obtain the closed access group information of the target cell from a message (for example a message known as SIB1) broadcasted periodically by the target node.

While intended to be updated infrequently, the closed access group information of a cell may be updated at any time, which means that unless the source cell requires user equipments to obtain the closed access group information of potential target cells very frequently, the source node may be storing obsolete closed access group information of a target cell at the time it initiates handover of a user equipment to the target cell. Frequent monitoring and reporting by user equipments of closed access group information of potential target cells is however undesired due to power consumption and the potentially necessary interruption of any data exchanges to allow for the monitoring. Initiating a handover based on a comparison of the closed access group information of the user equipment with obsolete closed access group information of a target cell may cause the source node to conclude that the handover is permitted, while, once initiated, the handover will fail due to access rejection by the target node based on current closed access group information of the target cell. Such failures degrade the performance experienced by the user equipment and the performance of the network, particularly when the source node attempts to handover many user equipments or the same user equipment repeatedly based on this obsolete closed access group information, as there is presently no mechanism to identify the cause of the failure nor to correct this situation other than to require the user equipment to again retrieve the closed access group information of the target cell from its broadcasted signal, which would cause additional significant handover delays, increasing the risk that the user equipment loses its connection with the source cell before the handover can be performed. Thus, solutions are needed in case a source cell has either no or obsolete closed access group information of the target cell.

Figure 2:
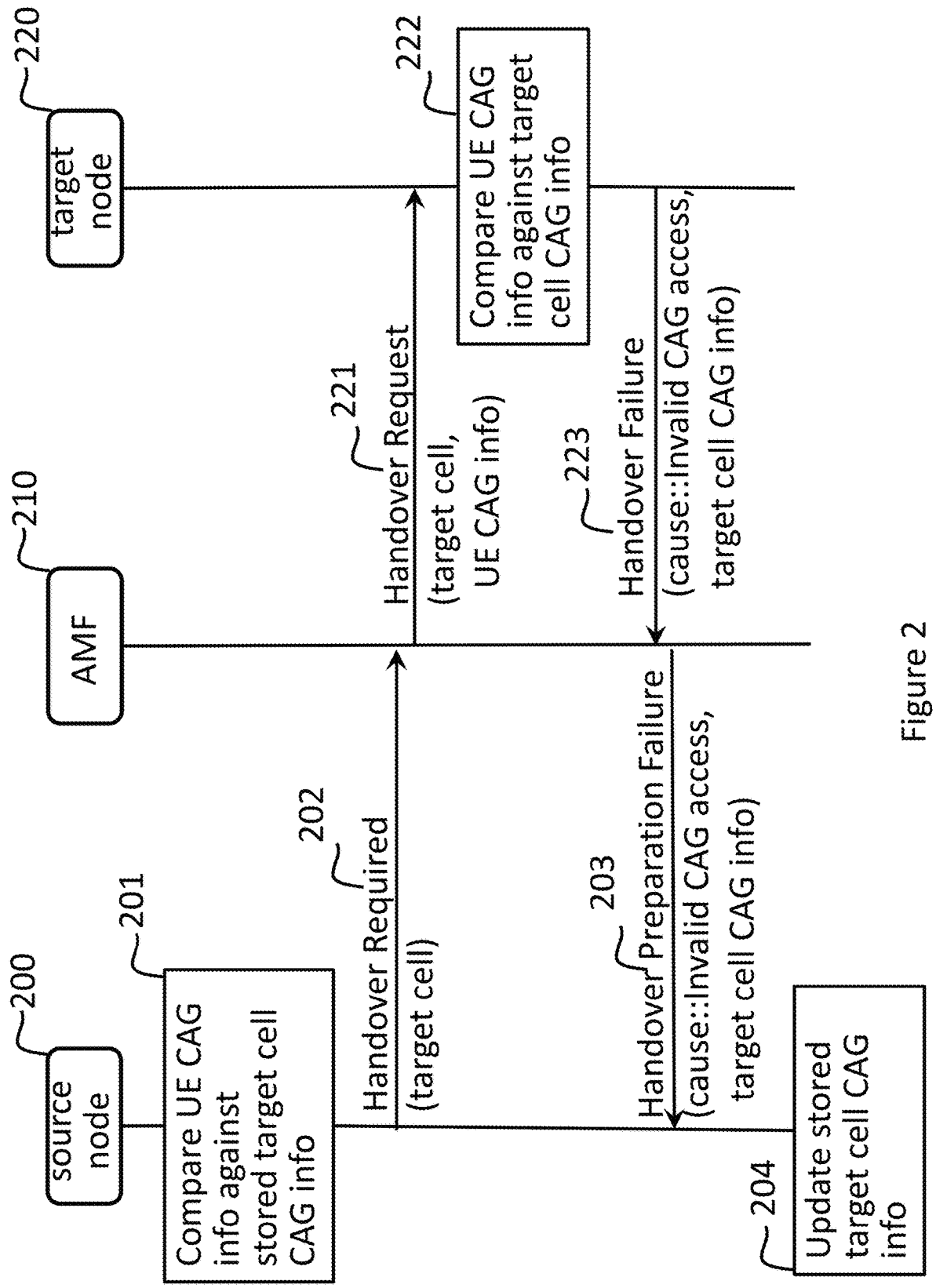
FIG. 2 illustrates a signaling exchange in accordance with embodiments of the invention.

FIG. 2 depicts a diagram in accordance with embodiments of the invention. In an embodiment, a source node (200) decides that it wishes to attempt to handover, or wishes to prepare for handover, a user equipment to a candidate target cell. As part of the decision, the source node compares (201) closed access group information of the user equipment against any stored access group information of the candidate target cell.

The source node may conclude from the comparison that the user equipment is not allowed access to the candidate target cell, for example when the user equipment is not allowed access to any closed access group supported by the target cell or when the user equipment is allowed access only to closed access groups (i.e. is not allowed access to public cells) and the target cell only allows public access. In such cases, the source node may repeat the comparison with other candidate target cells until it finds a candidate target cell for which the source node concludes that the user equipment is allowed access. This may for example occur if the candidate target cell is a public cell and the user equipment is allowed access to public cells or if the candidate target cell supports at least one closed access group to which the user equipment is allowed access.

Naturally, if the source cell runs out of suitable candidate target cells before it finds one to which the user equipment is allowed access, the handover attempt may be terminated.

For candidate target cells for which the source node lacks any closed access group information, the source node may take one of three approaches: in one approach it may assume that the user equipment is allowed access to this candidate target cell and proceed with the handover attempt to this target cell, or it may assume that the user equipment is not allowed access to this candidate target cell. In a third approach, it may assume the target cell is a public cell only and consider the user equipment allowed to access the candidate target cell only if the user equipment is allowed access to public cells. Either way, in these cases, the comparison is skipped as there is no closed access group information of the target cell available for comparison.

Once the source node concludes that the user equipment is allowed access to a candidate target cell and selects the candidate target cell to be the target cell at least based on this conclusion, it may proceed with signaling that handover is required, indicating at least the target cell. As in some embodiments the source node (200) lacks an Xn connection with the target node (220) managing the target cell, the signaling is sent to the AMF (210), for example over an N2 connection, which as a result sends a message such as a handover request (221) to the target node (220), for example over another N2 connection, comprising an indication of the target cell as well as closed access group information for the user equipment. In some embodiments, the closed access group information for the user equipment may be carried in a Mobility Restriction List.

Upon receiving the handover request (221), the target node proceeds with comparing (222) the received closed access group information for the user equipment against stored closed access group information for the target cell, similar to the comparing as described at 201. However, as noted previously, because the source node may be storing obsolete closed access group information of the target cell, or may have just assumed that the user equipment was allowed access to the target cell based on a lack of any stored closed access group information for the target cell, it is possible that the target node concludes that the user equipment is in fact not allowed to access the target cell. In such cases, the target cell proceeds with sending a handover failure message (223) towards the source node, which may contain an indication that the cause of the handover failure was invalid closed access group access and may further contain the stored closed access group information of the target cell, which was used in the comparison (222).

In embodiments where the source node and the target node lack an Xn connection, the handover failure message is sent to the AMF (210), for example over the another N2 connection, which as a result sends a message such as a handover preparation failure message (203) to the source node, for example over the N2 connection, which may contain both the cause indication and the stored closed access group information of the target cell as received in the handover failure message. The cause indication and the stored closed access group information of the target cell may in some embodiments be included in a target node to source node transparent container in the handover failure and handover preparation failure message, or may be visible to the AMF, for example by transferring it in a cell closed access group information element.

Upon receiving the handover preparation failure message (203), the source node may proceed with storing (204) any closed access group information contained in the message if the source node has no stored closed access group information for the target cell, or it may update (204) its stored closed access group information for the target cell with the closed access group information contained in the message. In some embodiments, if the handover preparation failure message lacks any closed access group information for the target cell, the source node may, in response to detecting the invalid closed access group cause indication, update the stored closed access group information for the target cell by removing from the closed access group indicated as accessible any entries which the user equipment was allowed to access. Alternatively, the source node may assume the target cell to not or no longer be accessible to any closed access group at least until updated closed access group information is obtained and at least update the stored closed access group information for the target cell by removing all closed access group indicated as accessible.

Figure 3:
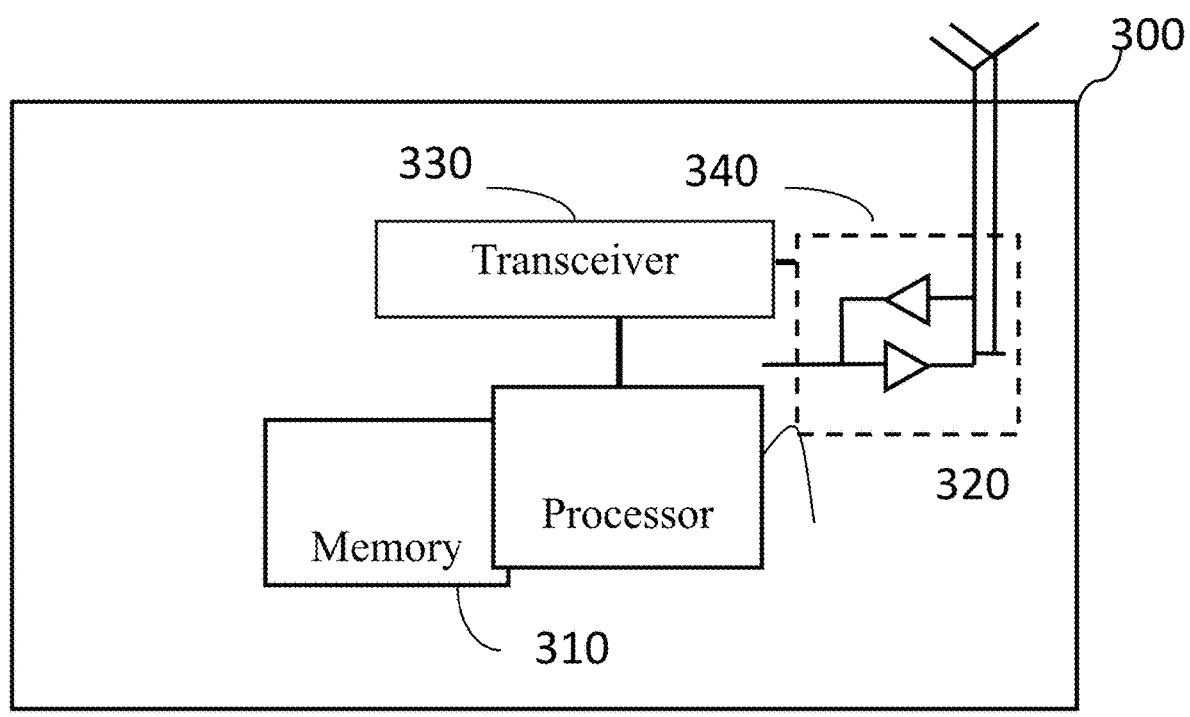
FIG. 3 illustrates a block diagram of an example wireless apparatus in accordance with embodiments of the invention.

FIG. 3 depicts a block diagram illustrating an example wireless apparatus (300) in accordance with embodiments of the invention. The wireless apparatus may include at least one processor (320), at least one memory (310) coupled to the at least one processor (320) and at least one suitable transceiver (330) having a transmitter and a receiver coupled to the at least one processor (320), coupled to at least one antenna unit (650) through at least one amplifier (340). The at least one memory (310) may store computer programs, which may, when executed by the at least one processor (320), for example in combination with any of the at least one transceiver (330), at least one amplifier (340) and at least one antenna unit (350), perform embodiments of the invention. For example, a source node or target node may be embodied in apparatus 300.

An AMF may be embodied in the same apparatus or in a separate apparatus, where if it is embodied in a separate apparatus, it typically lacks the at least one antenna unit (350), where the transceiver instead is connected over a wired, for example optical, interface.

Embodiments of the invention may be implemented in software (executed by one or more processors), hardware (e.g., an application specific integrated circuit or field programmable gate array), or a combination of software and hardware. In an example embodiment, the software (e.g., application logic, an instruction set) is maintained on any one of various conventional non-transitory computer-readable media.

Although various aspects are set out above, other aspects comprise other combinations of features from the described embodiments, and not solely the combinations described above.

The invention claimed is:

1. An apparatus, comprising:
at least one processor; and
at least one memory including computer program code
the at least one memory and the computer program code configured to, with the at least one processor, cause the apparatus at least to:
  decide to attempt to handover a user equipment to a target cell associated with a target node, wherein, when stored closed access group information of the target cell is available, the deciding based at least in part on a comparison of a closed access group information of the user equipment and the stored closed access group information of the target cell;
  send, to the target node, a handover message comprising an identifier of the target cell;
  receive, from the target node, a handover failure message comprising second closed access group information of the target cell; and
  update, when the stored closed access group information of the target cell is available, the stored closed access group information of the target cell with the second closed access group information of the target cell and store, when the stored closed access group information of the target cell is not available, the second closed access group information of the target cell.

2. The apparatus of claim 1, wherein the second closed access group information of the target cell is received in a transparent target to source container included in the handover failure message, which has been relayed transparently from a core network.

3. The apparatus of claim 1, wherein the second closed access group information comprises a list of one or more identifiers of closed access groups supported by the target cell or an indication that the target cell does not support closed access groups.

4. The apparatus of claim 1, wherein at least one of:
the handover failure message is a handover preparation failure message; and
the handover message is a handover required message.

5. The apparatus of claim 1, wherein the second closed access group information comprises closed access group information in use by the target cell substantially between the sending and receiving.

6. The apparatus of claim 1, wherein the sending to the target node and the receiving from the target node comprise sending to the target node via a mobility management function and receiving from the target node via the mobility management function over respective N2 interfaces.

7. The apparatus of claim 1, wherein the handover failure message provides a cause indication, the cause indication indicating that the cause of the handover failure was invalid closed access group access.

8. An apparatus, comprising:
at least one processor; and
at least one memory including computer program code
the at least one memory and the computer program code configured to, with the at least one processor, cause the apparatus at least to:
  receive a handover request message comprising a closed access group information of a user equipment and an identifier of a target cell;
  decide, at least in part based on one of:
    a comparison of the closed access group information of the user equipment and stored closed access group information of the target cell or
    a determination that the target cell does not support any closed access groups and that the closed access group information of the user equipment indicates the user equipment not to be allowed to be handed over to cells not supporting closed access groups,
  that the user equipment is not allowed to be handed over to the target cell; and
  send, towards a source node associated with the handover request message, a handover failure message including the stored closed access group information of the target cell.

9. The apparatus of claim 8, wherein the stored closed access group information of the target cell comprises a list of one or more identifiers of closed access groups supported by the target cell or an indication that the target cell does not support closed access groups.

10. The apparatus of claim 8, wherein the closed access group information of the target cell is transmitted in a transparent target to source container included in the handover failure message, to be relayed transparently through a core network.

11. The apparatus of claim 8, wherein the sending towards the source node and the receiving comprise sending towards the source node via a mobility management function and receiving from the source node via the mobility management function over respective N2 interfaces.

12. The apparatus of claim 8, wherein the closed access group information of the user equipment is provided to the apparatus by an access and mobility management function of a core network.

13. The apparatus of claim 7, wherein the closed access group information of the user equipment is provided to the apparatus in a Mobility Restriction List.

14. The apparatus of claim 7, wherein the handover failure message provides a cause indication, the cause indication indicating that the cause of the handover failure was invalid closed access group access.

15. A method comprising:
receiving a handover request message comprising a closed access group information of a user equipment and an identifier of a target cell;
deciding, at least in part based on one of:
a comparison of the closed access group information of the user equipment and stored closed access group information of the target cell or
a determination that the target cell does not support any closed access groups and that the closed access group information of the user equipment indicates the user equipment not to be allowed to be handed over to cells not supporting closed access groups,
that the user equipment is not allowed to be handed over to the target cell; and
sending, towards a source node associated with the handover request message, a handover failure message including the stored closed access group information of the target cell.

16. The method of claim 15, wherein the stored closed access group information of the target cell comprises a list of one or more identifiers of closed access groups supported by the target cell or an indication that the target cell does not support closed access groups.

17. The method of claim 15, wherein the closed access group information of the target cell is transmitted in a transparent target to source container included in the handover failure message, to be relayed transparently through a core network.

18. The method of claim 15, wherein the closed access group information of the user equipment is provided by an access and mobility management function of a core network.

19. The method of claim 15, wherein the closed access group information of the user equipment is provided to the apparatus in a Mobility Restriction List.

20. The method of claim 15, wherein the handover failure message provides a cause indication, the cause indication indicating that the cause of the handover failure was invalid closed access group access.

* * * * *